W. N. BEST, Jr.
HYDROCARBON BURNER.
APPLICATION FILED JUNE 16, 1909.
963,985.
Patented July 12, 1910.
2 SHEETS—SHEET 1.
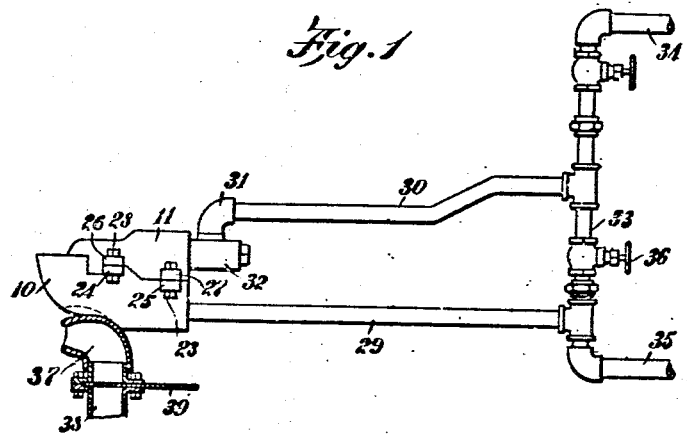
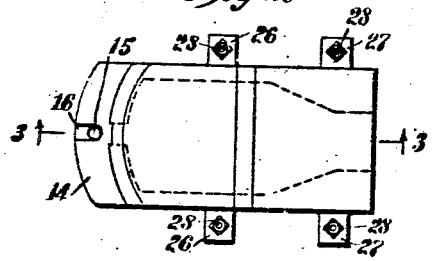
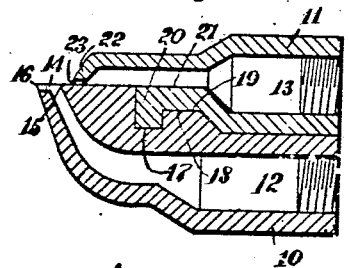
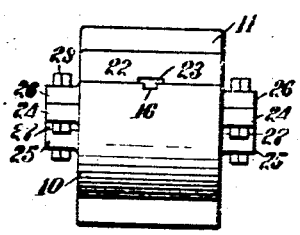
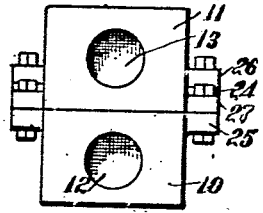
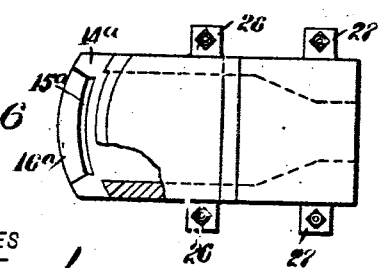
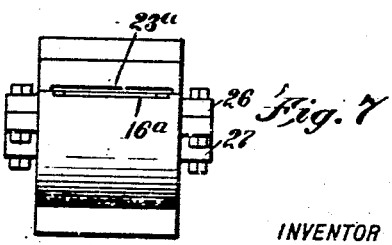
WITNESSES
INVENTOR
William Newton Best Jr.
BY Munn & Co
ATTORNEYS W. N. BEST, Jr.
HYDROCARBON BURNER.
APPLICATION FILED JUNE 16, 1909.
963,985.
Patented July 12, 1910.
2 SHEETS—SHEET 2.
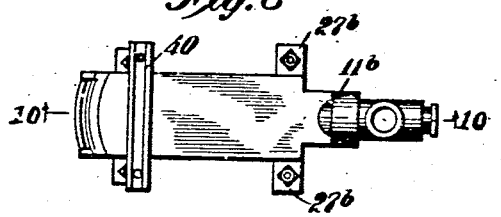
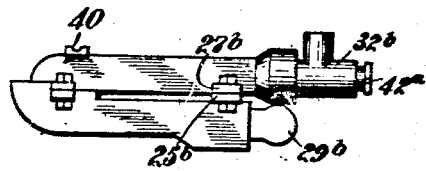
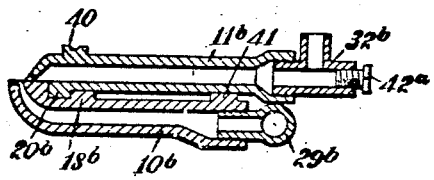
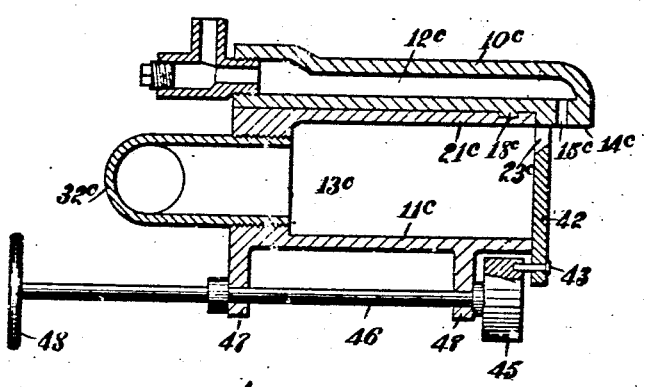
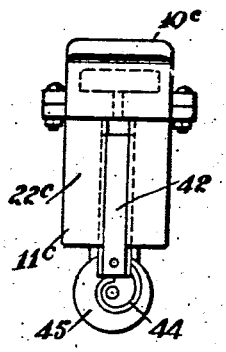
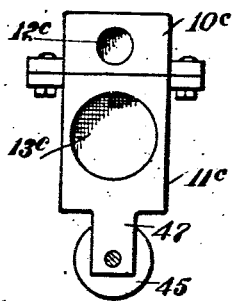
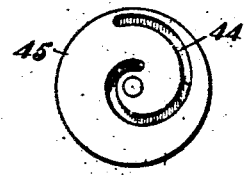
WITNESSES
INVENTOR
William Newton Best Jr
BY
ATTORNEYS

UNITED STATES PATENT OFFICE.

WILLIAM NEWTON BEST, JR., OF NEW YORK, N. Y., ASSIGNOR OF THREE-FOURTHS TO WILLIAM NEWTON BEST, SR., OF BROOKLYN, NEW YORK.

HYDROCARBON-BURNER.

963,985.  Specification of Letters Patent.  Patented July 12, 1910.

Application filed June 16, 1909. Serial No. 502,473.

*To all whom it may concern:*

Be it known that I, WILLIAM NEWTON BEST, Jr., a citizen of the United States, and a resident of the city of New York, borough of Manhattan, in the county and State of New York, have invented a new and Improved Hydrocarbon-Burner, of which the following is a full, clear, and exact description.

This invention relates to certain improvements in hydrocarbon burners, and more particularly to that type of burner in which a liquid or semi-liquid fuel is atomized and delivered in the form of a spray by means of an expansive fluid, as, for instance, compressed air or steam.

The general type of burner to which my invention relates is that in which the fuel is exteriorly atomized. Burners of this type are adapted for use with locomotives or stationary boilers and with large furnaces in which heavy oils or tar are used in large quantities. Although it is desirable in some types of furnaces to vertically adjust or regulate the supply of expansive fluid by the use of a nozzle piece, such as that shown in the prior Patent, No. 752,195, granted February 16, 1904, yet in other types of boilers no adjustment whatsoever need be employed, and the mere presence of an adjusting means often tempts inexperienced workmen to make undesirable adjustments. Furthermore, the forming of the burner of a single casting with separate passages for the fuel and expansive fluid results in many defective burners and renders the burner useless if any portion thereof becomes broken or otherwise injured.

In my improved burner I provide two separate and distinct nozzle pieces, each formed of a separate casting, the two nozzle pieces being so constructed that they can be secured together only in one particular relationship which is found best suited for the work demanded of the burner. The two nozzles are rigidly secured together and the two outlets are so disposed in respect to each other, that the expansive fluid blows across the face of the other nozzle in which the fuel supply passage terminates.

A further important feature of my invention is the forming of the outlet from the atomizing nozzle of a slightly greater width than the outlet from the fuel nozzle, so that there is produced somewhat of a siphon effect upon the liquid fuel to draw the latter upwardly and outwardly from its nozzle.

In the ordinary type of burner particularly when heavy oils or tar are employed, I preferably place the expansive fluid nozzle above the fuel nozzle, but I have found that where very volatile oils are used, it is desirable to place the expansive fluid nozzle below the fuel nozzle and to provide means for regulating the size of the outlet for the expansive fluid. This permits a regulation of the air supply and a second regulation of the fuel, so as to permit the use of a smaller quantity of fuel after the furnace has become thoroughly heated.

Other important features of my invention will be described hereinafter and particularly pointed out in the claims. It is, of course, evident that all of the various features of my burner may be utilized in one construction or various features may be used independently of other features.

Reference is to be had to the accompanying drawings, forming a part of this specification, in which similar characters of reference indicate corresponding parts in all the figures, and in which—

Figure 1 is a side elevation of a burner constructed in accordance with my invention and having the necessary pipe connections thereto and an auxiliary air delivery nozzle beneath the burner; Fig. 2 is a top plan view of the burner shown in Fig. 1; Fig. 3 is a longitudinal section on the line 3—3 of Fig. 2; Fig. 4 is an end view showing the delivery end of the burner; Fig. 5 is an end view showing the rear end of the burner; Fig. 6 is a top plan view of a slightly modified form of nozzle provided with wider outlets; Fig. 7 is a view of the delivery end of the nozzle shown in Fig. 6; Fig. 8 is a top plan view of a further modified form of burner; Fig. 9 is a side elevation of the burner shown in Fig. 8; Fig. 10 is a longitudinal section taken on the line 10—10 of Fig. 8; Fig. 11 is a view showing the delivery end of the nozzle shown in Figs. 8, 9 and 10; Fig. 12 is a longitudinal section through a further modified form of burner; Fig. 13 is a view showing the delivery end of the nozzle shown in Fig. 12; Fig. 14 is a view showing the rear end of the burner shown in Fig. 12; and Fig. 15 is a face view of the operating cam for regulating the nozzle piece of the burner shown in Fig. 12.

In the specific burner illustrated in Figs. 1 to 5, inclusive, there are provided two separate nozzles 10 and 11, adapted to engage with each other and be rigidly secured against lateral displacement. Each nozzle is formed of cast metal and has a passage therethrough substantially rectangular in vertical cross section. The fuel nozzle 10 is provided with a threaded opening at the rear end thereof and the passage 12 through the nozzle extends from said threaded opening lengthwise of the nozzle and upwardly so as to deliver through the upper or top face 14 of the nozzle. This face 14 is substantially flat and extends in a plane parallel to the general direction of the burner. The passage 12 is reduced in size as it approaches the flat surface 14 and terminates in an aperture 15 substantially circular in form. From this aperture to the outer end of the burner, that is, to the outer edge of the surface 14, there is provided a very shallow groove or channel 16 of the same width as the opening 15 but of less depth. At the rear of the surface 14, I provide a groove or channel 17 in the upper surface of the nozzle member and in the rear of this groove may be provided an upwardly-extending transverse corrugation 18. The upper surface of this corrugation is in a plane below the plane of the surface 14.

The passage 13 in the nozzle member 11 and through which is delivered the air or steam, is provided with a threaded aperture in the rear end thereof, which may be connected to suitable means for delivering the air or steam. The lower or under wall of the nozzle is provided with a corrugation or groove 19 in its outer surface adapted to receive the flange 18 of the nozzle 10, and the front edge of the lower wall terminates in a depending flange 20 extending into the groove or corrugation 17 of the fuel nozzle. The upper or inner surface of the lower wall of the nozzle 11 presents a flat surface 21 in the same plane with the surface 14 of the nozzle member 10 and disposed directly at the end thereof. The upper wall of the nozzle 11 extends forwardly beyond the lower wall and terminates in a downwardly-extending flange 22 contacting with the surface 14 along a portion of its length. The lower edge of this flange is cut away to leave a passage 23 directly opposite to the aperture 15 and of slightly greater width than said aperture. This passage or outlet 23 permits the escape of the air or steam across the surface or face 14, and directly across the upper end of the opening 15 and along the trough or channel 16. The width and height of this passage is so proportioned to the size of the opening 15 that with the normal pressure of the fuel and expansive fluid, the fuel will be sprayed outwardly in a substantially horizontal plane and in substantially fan-shaped form.

The burner itself needs no adjustment whatsoever and the two nozzles of the burner are rigidly secured together in fixed relationship. Various means may be employed for securing them to each other, but preferably the fuel nozzle 10 is provided with two outwardly-extending lugs 24 and 25, at each side thereof and each having its upper surface substantially in the plane of the adjacent portion of the upper surface of the nozzle. These lugs are directly opposite to two lugs 26 and 27 integral with the upper nozzle, and the several pairs of opposed lugs may be secured together in any suitable manner, as, for instance, by bolts 28.

The burner may be used for heating any desired chamber or compartment, or any desired article or object. As shown, a pipe 29 is screwed into the rear end of the fuel nozzle and a pipe 30 is connected by an elbow 31 and a tee 32 to the air or steam nozzle. These two pipes are connected to a vertical pipe 33, the upper end of which connects to an air or steam supply pipe 34, and the lower end of which connects to a fuel supply pipe 35. Each of the supply pipes 34 and 35 may be provided with suitable controlling valves whereby the fuel and expansive fluid may be independently regulated, and in the pipe 33 there is preferably provided a valve 36. Should the fuel nozzle become clogged or should it become desirable to clean out the same for any reason whatsoever, the valve in the fuel supply pipe may be closed and the valve 36 opened, so that steam or compressed air from the pipe 34 may pass to the pipe 29 and thence through the fuel nozzle.

In using the nozzle shown in Fig. 1 in a closed chamber or compartment, it is necessary to supply air or oxygen to support combustion. For supplying this supporter of combustion, I provide a nozzle 37 fitting upon the upper end of the delivery pipe 38 and disposed directly below the burner. This nozzle preferably delivers the air in the same general direction as does the burner, but below the same. The supply of air may be controlled by a slide valve 39 in the pipe 38 or in any other suitable manner.

The specific form of burner illustrated in Figs. 1 to 5, inclusive, is especially adapted for use in connection with boilers, in which a comparatively long narrow blaze is desired. For furnaces it is often desirable that a wider and more nearly fan-shaped blaze be formed in order that there may be a more even distribution of the heat.

In Figs. 6 and 7, I have illustrated a burner similar to that shown in Figs. 1 to 5, inclusive, in all respects, except as regards the size and relative proportions of the outlets for the fuel and expansive fluid. In this form the ends of the burners terminate in an arc of a circle, so that the exposed portion or face 14$^a$ is arcuate in form, and in this face is the curved or arcuate narrow slot 15$^a$, constituting the fuel outlet. From this outlet extends a channel or trough 16$^a$ to the outer end of the nozzle and having its side walls diverging to facilitate the formation of the fan-shaped blaze. In the air or steam nozzle there is formed a curved slot or opening 23$^a$ of slightly greater width than the opening 15$^a$.

For using my improved burner in locomotives, I preferably form said burner substantially as shown in Figs. 8 to 11, inclusive. This form of burner is very similar to that above described, except that it is preferably made somewhat narrower and longer. The upper nozzle 11$^b$ is provided with a cross bracket 40, adapted to be secured to the mud-ring of a locomotive to hold the burner in place. Instead of the two nozzles having their adjacent faces contacting throughout the length of the nozzles, as in the form above described, I may space them apart and provide the lower or fuel nozzle 10$^b$ with a transverse spacing flange 41 at its rear end to engage with the under surface of the upper burner. This flange may terminate at its ends in lugs 25$^b$, by means of which the rear end of the lower nozzle may be secured to lugs 27$^b$ at the rear end of the upper nozzle. The two nozzles have coacting flanges 18$^b$ and 20$^b$, similar to the flanges 18 and 20 of the form above described. Between the flanges 18$^b$ and 41, the two nozzles are preferably spaced apart. This burner is somewhat smaller than the burner illustrated in Fig. 1, and it is, therefore, necessary to engage the rear end portions of the two nozzles to facilitate the attachment of the conduit 29$^b$ and the tee 32$^b$. The tee has a plug 42$^a$ closing one end thereof and in direct alinement with the passage through the nozzle to facilitate the cleaning of the latter.

In utilizing my invention in a low pressure burner in which volatile oils and air at low pressure are employed, I have found it is more desirable to place the air nozzle below the fuel nozzle and so construct the air nozzle that the volume of air delivered therethrough may be readily controlled. In burners of this character, it is common to utilize a low air pressure varying from four ounces to about five pounds, and as air at different pressures produces different atomizing effects on the fuel, I provide a nozzle piece on the air nozzle, so constructed that it may be moved toward or from the superposed fuel nozzle.

In the specific form of low pressure nozzle illustrated in Figs. 12 to 15, inclusive, I employ an air nozzle 11$^c$, and superposed upon the same and delivering downwardly is the fuel nozzle 10$^c$. The fuel nozzle has a passage 12$^c$ therethrough and at its outer end it is provided with a substantially horizontal flat under face 14$^c$ having an aperture 15$^c$ therethrough and constituting the delivery end of the passage 12$^c$. The air nozzle 11$^c$ has the inner surface 21$^c$ of the upper wall thereof terminating adjacent the edge of the surface 14$^c$ and in the same plane therewith, and the upper portion of the air nozzle is open so that the air in escaping blows along the surface and across the opening 15$^c$. The two nozzles are held against relative longitudinal movement by suitable coacting flanges 18$^c$ and 21$^c$, and are secured together by suitable lugs and bolts. The passage 13$^c$ through the air nozzle is enlarged to form a damper and the delivery pipe 32$^c$ is of comparatively large size, so that a large quantity of air under comparatively low pressure may be delivered to the nozzle. The outer end 22$^c$ of the nozzle is provided with a slot 23$^c$ extending vertically and from the under surface of the fuel nozzle to the lower edge of the lower surface of the air nozzle. Within this slot is provided a slide or nozzle piece 42, vertically movable and preferably beveled or dovetailed to prevent it from being forced outwardly by the air pressure. The lower end of this nozzle piece extends below the lower surface of the air nozzle and is provided with a pin 43 extending into a spiral groove 44 in a rotatable member 45. This rotatable member or disk is carried on a rod or shaft 46, which latter is mounted in lugs 47 depending from the under side of the burner. At the rear end of the rod there is provided a handle 48, by the rotation of which the disk 45 may be turned to move the nozzle piece 42 upwardly or downwardly as may be desired, to control the size of the air outlet opening 23$^c$. The upper edge of the nozzle piece is preferably beveled upwardly from the inside and as it moves toward and from the fuel nozzle, it is evident that the air will blow directly across the fuel outlet irrespective of the position of the nozzle piece. In this form, as in the other forms of nozzle illustrated, the air outlet is preferably somewhat wider than the fuel outlet, so that the air will produce somewhat of a siphon effect on the fuel. This burner is particularly adapted for use in furnaces where it is desired to vary the amount of heat by varying the quantity of liquid fuel and the quantity of air used to atomize and combine with the latter. The operator can readily increase or decrease the air pressure as necessity demands, and thus regulate the fire.

In low pressure burners, it is desirable to have the air nozzle below the fuel nozzle, whereas in high pressure burners in which tar or crude oil is employed, it is desirable to place the air nozzle above, which tends to prevent carbonizing of the orifices.

Having thus described my invention, I claim as new and desire to secure by Letters Patent:

1. A hydrocarbon burner, including two members, each having a passage therethrough, the bottom wall of one member lying closely adjacent and rigidly secured to the top wall of the other member, one of said members having a fuel outlet delivering across the end of the other member and said other member having an outlet for vaporizing fluid delivering across the outlet from the first-mentioned member.

2. A hydrocarbon burner, including two burner members, each having a passage therethrough, the walls forming one passage being separate and distinct from the walls forming the other passage, and each of said members being formed of cast metal, one of said members having a fluid outlet delivering transversely of the general direction of the burner and the other of said members having a vaporizing fluid outlet delivering in the general direction of the burner and transversely of the first-mentioned passage.

3. A hydrocarbon burner, including two members, each having a passage therethrough, the walls of which are independent of the walls of the other passage, one of said members having a groove in the face thereof toward the other member and said other member having a flange for engagement within said groove for preventing relative longitudinal movement of the members.

4. A hydrocarbon burner having two independent nozzle members, each formed of cast metal and substantially rectangular in form and having a flange extending across one surface thereof, and lugs upon opposite edges thereof, the flanges of the two nozzle members coacting to prevent relative longitudinal movement, and means for engaging with said lugs to hold said nozzle members rigid in respect to each other.

5. A hydrocarbon burner, including a fuel nozzle having a face provided with an aperture therein and a passage leading to said aperture, a groove in the rear edge of said face of the nozzle adjacent the rear edge of said face, and an atomizing nozzle having a flange entering said groove and preventing relative longitudinal movement of the two nozzles.

6. A hydrocarbon burner, including a fuel nozzle having a face provided with an aperture therein and a passage leading to said aperture, a groove in the outer side of the nozzle adjacent the rear edge of said face, and an atomizing nozzle having a flange entering said groove and preventing relative longitudinal movement of the two nozzles, said atomizing nozzle having a passage therethrough, the inner surface of one side of which lies substantially in the plane of said face.

7. An atomizer, having two independent nozzle members, one of which has a passage therethrough and a face having an aperture therein, to which said passage extends, and having an open-top recess from said aperture to the end of the nozzle member, and the other of said nozzle members having the upper surface of the floor thereof in the plane of said face and having the opposite wall thereof extending beyond said floor and terminating in a depending flange spaced from said face in the rear of said aperture to leave an aperture through which expansive fluid may escape across said face.

8. An atomizer, having two independent superposed nozzle members, one of which has a passage therethrough and a face having an aperture therein to which said passage extends, and having an open-top recess from said aperture to the end of the nozzle member, and the other of said nozzle members having the floor thereof in the plane of said face and having the opposite wall thereof extending beyond said floor and terminating in a depending flange spaced from said face in the rear of said aperture to leave an aperture through which expansive fluid may escape across said face, said last-mentioned aperture being of greater width than said first-mentioned aperture.

9. A hydrocarbon burner, including two independent superposed nozzle members, each having a passage therethrough, the walls forming one passage being separate and distinct from the walls forming the other passage; one wall of one member having an aperture therethrough and presenting a flat outer surface, and one wall of the other member presenting a flat inner surface, and means for securing said members together with said surfaces in alinement.

10. A hydrocarbon burner, including two independent superposed nozzle members, each having a passage therethrough, the inner wall of one member presenting an outer surface with a delivery aperture therethrough, and the inner wall of the other member presenting an inner surface in alinement with said outer surface, and the outer wall of said last-mentioned member extending beyond the inner wall and terminating adjacent said outer surface of the first-mentioned member and spaced therefrom to leave a delivery outlet.

11. A hydrocarbon burner, including two independent superposed nozzle members, each having a passage therethrough and one serving for the delivery of fuel and the other serving for the delivery of an atomizing fluid, the fuel member having a delivery outlet in the upper face thereof, and the atomizing member having one wall presenting an inner surface in the same plane with said face and having the outer wall extending beyond the inner wall and terminating adjacent said face, and means for rigidly securing said nozzle members together.

12. A hydrocarbon burner, including two superposed nozzle members, each having a passage therethrough, the walls forming the passage of one member being separate and distinct from the walls forming the passage of the other member, one of said members having a fluid outlet delivering transversely of the general direction of the burner, and the other of said members having a vaporizing fluid outlet delivering in the general direction of the burner and transversely of the first-mentioned passage, and means for rigidly securing together said members directly together in a definite and predetermined relationship.

13. An atomizer having two independent superposed nozzle members, each having a passage therethrough, the walls forming one passage being separate and distinct from the walls forming the other passage, one of said members having a face provided with an aperture therein to which the passage of said member extends, and the other of said nozzle members having the floor thereof in the plane of said face and having the opposite wall thereof extending beyond said floor and terminating in a depending flange spaced from said face in the rear of said aperture to leave an aperture through which expansive fluid may escape across said face.

In testimony whereof I have signed my name to this specification in the presence of two subscribing witnesses.

WILLIAM NEWTON BEST, Jr.

Witnesses:
 CLAIR W. FAIRBANK,
 PHILIP D. ROLLHAUS.